(12) United States Patent
Kaneki

(10) Patent No.: US 9,025,243 B2
(45) Date of Patent: May 5, 2015

(54) MICROSCOPE APPARATUS

(75) Inventor: Shinsuke Kaneki, Tokyo (JP)

(73) Assignee: Olympus Corporation, Tokyo (JP)

( * ) Notice: Subject to any disclaimer, the term of this patent is extended or adjusted under 35 U.S.C. 154(b) by 310 days.

(21) Appl. No.: 13/489,899

(22) Filed: Jun. 6, 2012

(65) Prior Publication Data
US 2012/0320453 A1    Dec. 20, 2012

(30) Foreign Application Priority Data
Jun. 16, 2011    (JP) .................. 2011-134057

(51) Int. Cl.
G02B 21/00    (2006.01)
G02B 21/08    (2006.01)
G02B 21/24    (2006.01)

(52) U.S. Cl.
CPC ............ G02B 21/082 (2013.01); G02B 21/241 (2013.01); G02B 21/245 (2013.01)
USPC ....................................................... 359/379

(58) Field of Classification Search
CPC ... G02B 21/24; G02B 21/241; G02B 21/0008
See application file for complete search history.

(56) References Cited

U.S. PATENT DOCUMENTS

| | | | |
|---|---|---|---|
| 6,496,309 B1* | 12/2002 | Bliton et al. | 359/618 |
| 7,071,451 B2 | 7/2006 | Ishikawa et al. | |
| 2003/0098921 A1 | 5/2003 | Endo | |
| 2004/0113043 A1 | 6/2004 | Ishikawa et al. | |

FOREIGN PATENT DOCUMENTS

| | | | |
|---|---|---|---|
| JP | 2003167183 A | 6/2003 | |
| JP | 2004-70276 A | 3/2004 | |
| JP | 2007286250 A | 11/2007 | |
| JP | 4097761 B2 | 3/2008 | |
| JP | 2012173373 A | 9/2012 | |

OTHER PUBLICATIONS

Japanese Office Action dated Mar. 10, 2015, issued in counterpart Japanese Application No. 2011-134057.

* cited by examiner

*Primary Examiner* — Jennifer L. Doak
(74) *Attorney, Agent, or Firm* — Holtz, Holtz, Goodman & Chick PC

(57) ABSTRACT

The present invention can realize stable focus tracking in the AF control of a microscope by calculating an evaluation function based on a light intensity signal received in two regions and adjusting the slope of the evaluation function to be constant.

3 Claims, 14 Drawing Sheets

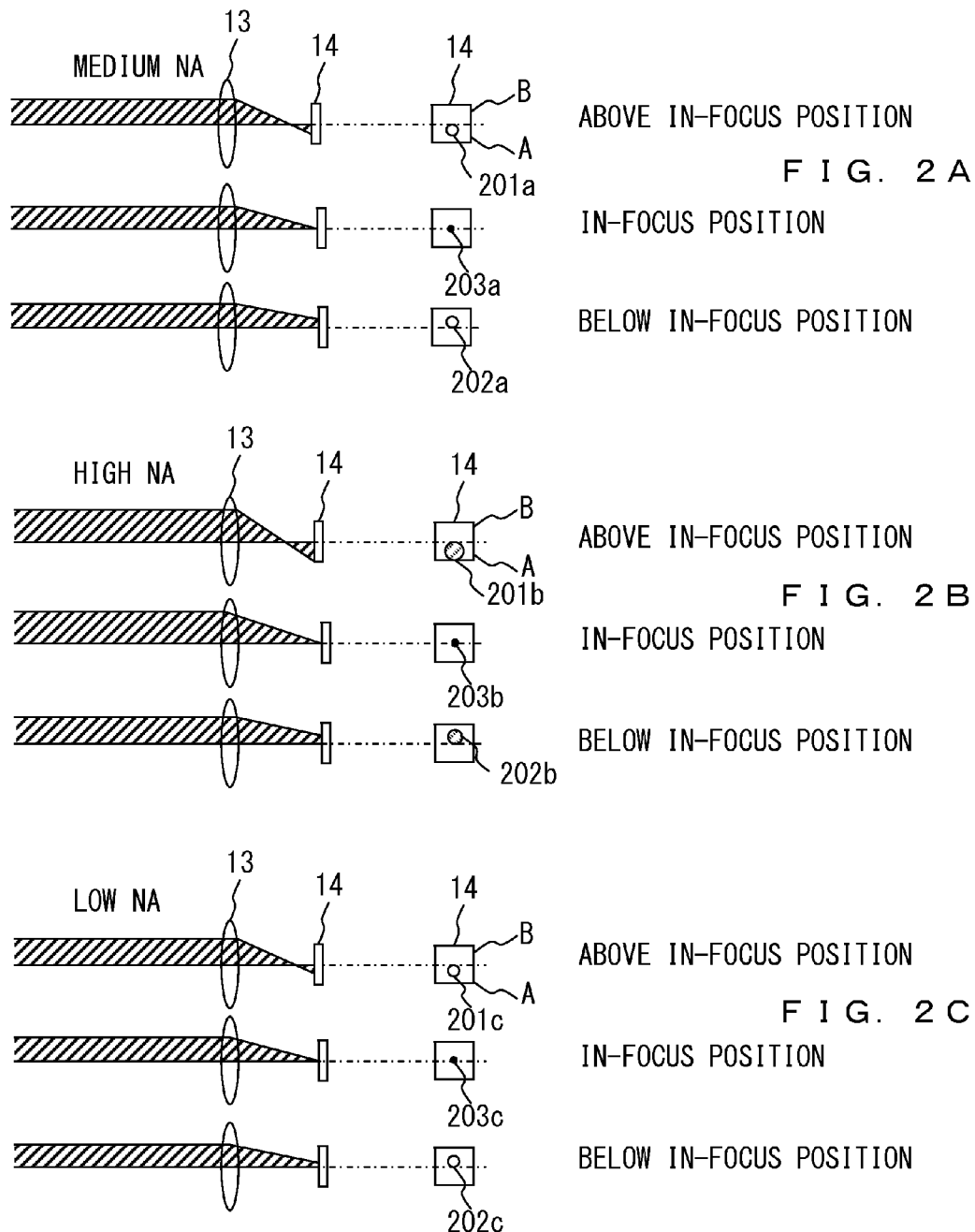

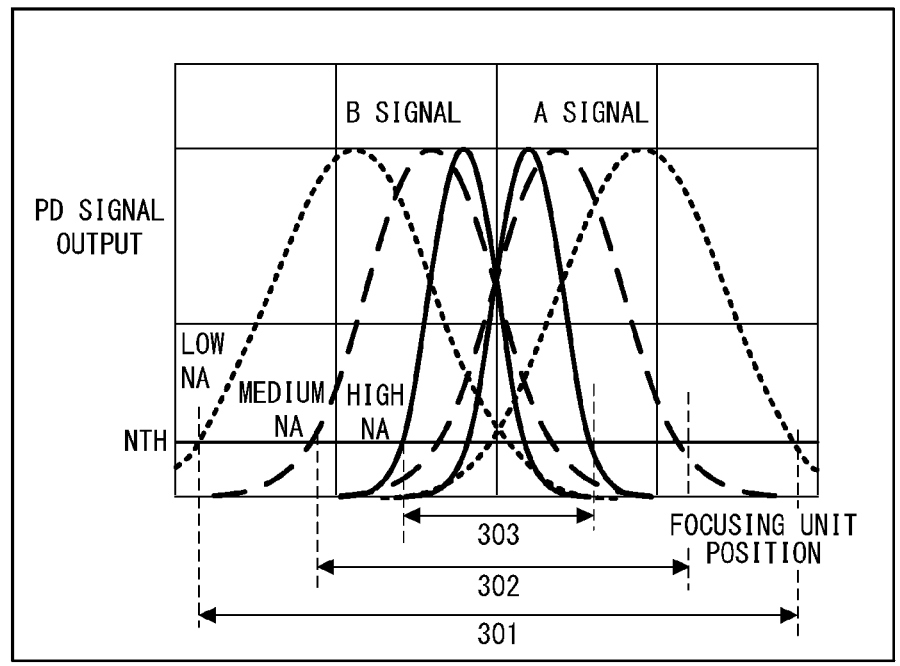
F I G. 3A
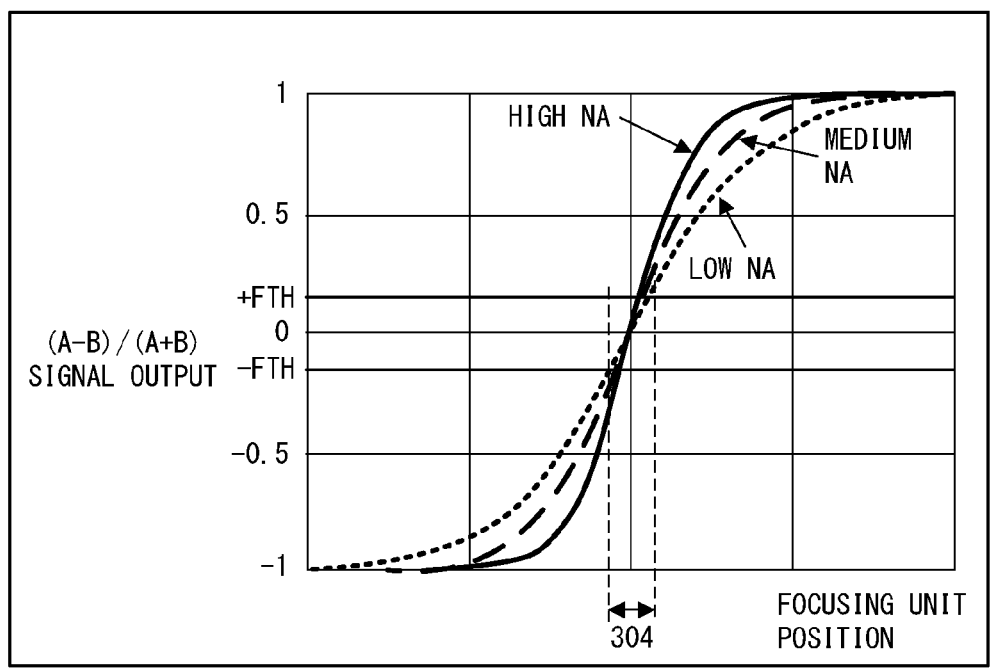
F I G. 3B

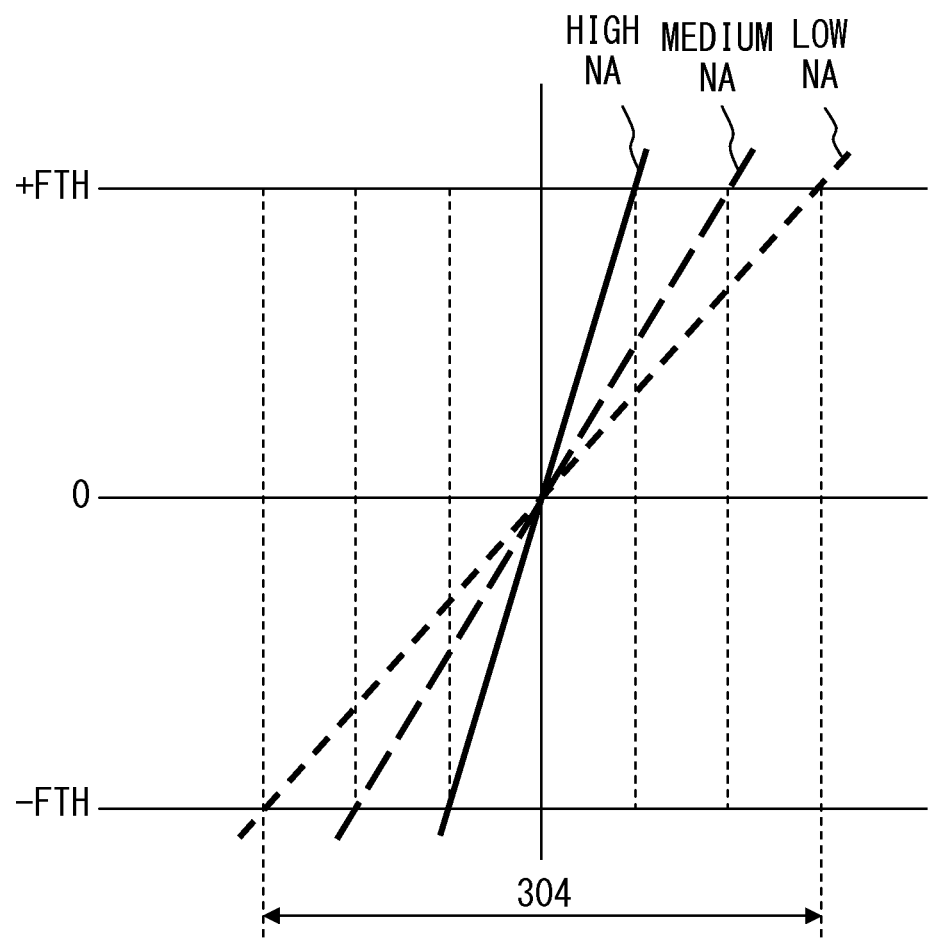
F I G. 4

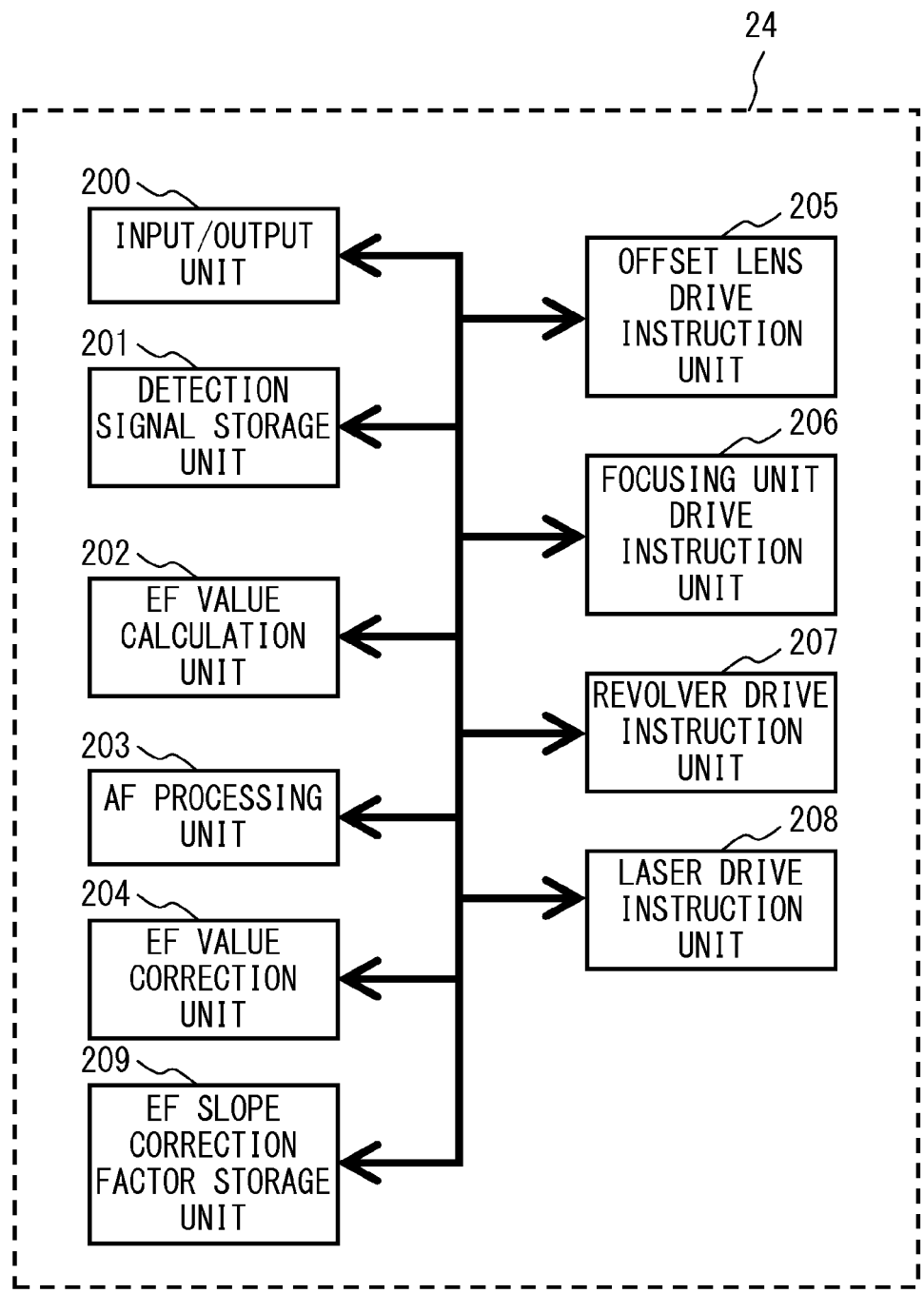
F I G. 5

| OFFSET LENS POSITION | -4~0mm | 0~5mm | 5~10mm | 10~15mm | 15~20mm | 20~22mm |
|---|---|---|---|---|---|---|
| CORRECTION FACTOR | 1 | 1.1 | 1.2 | 1.3 | 1.4 | 1.5 |

FIG. 7

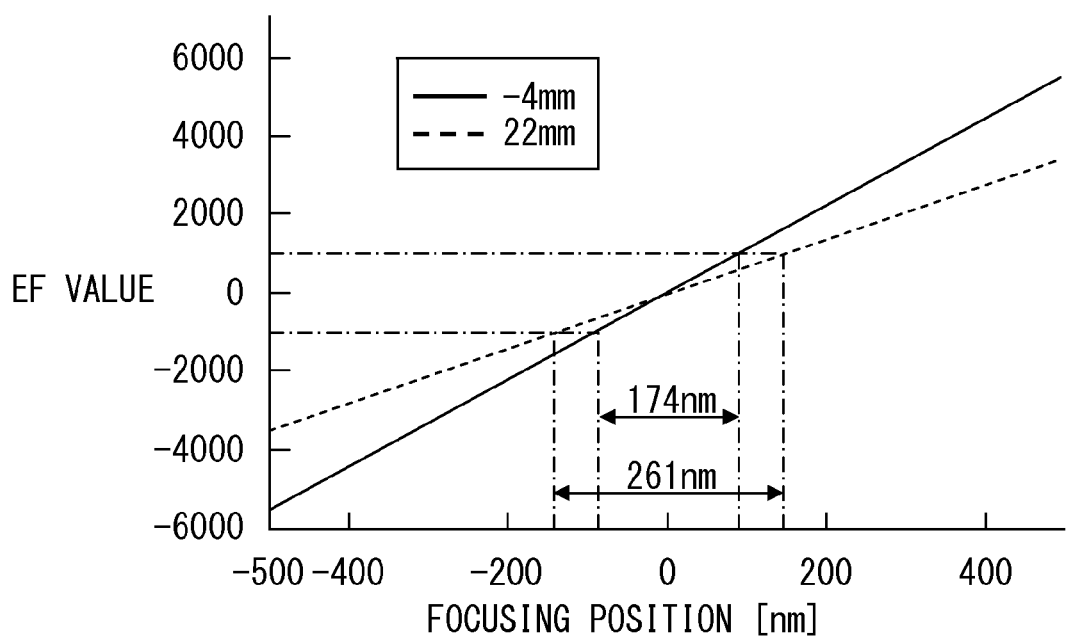
F I G. 8

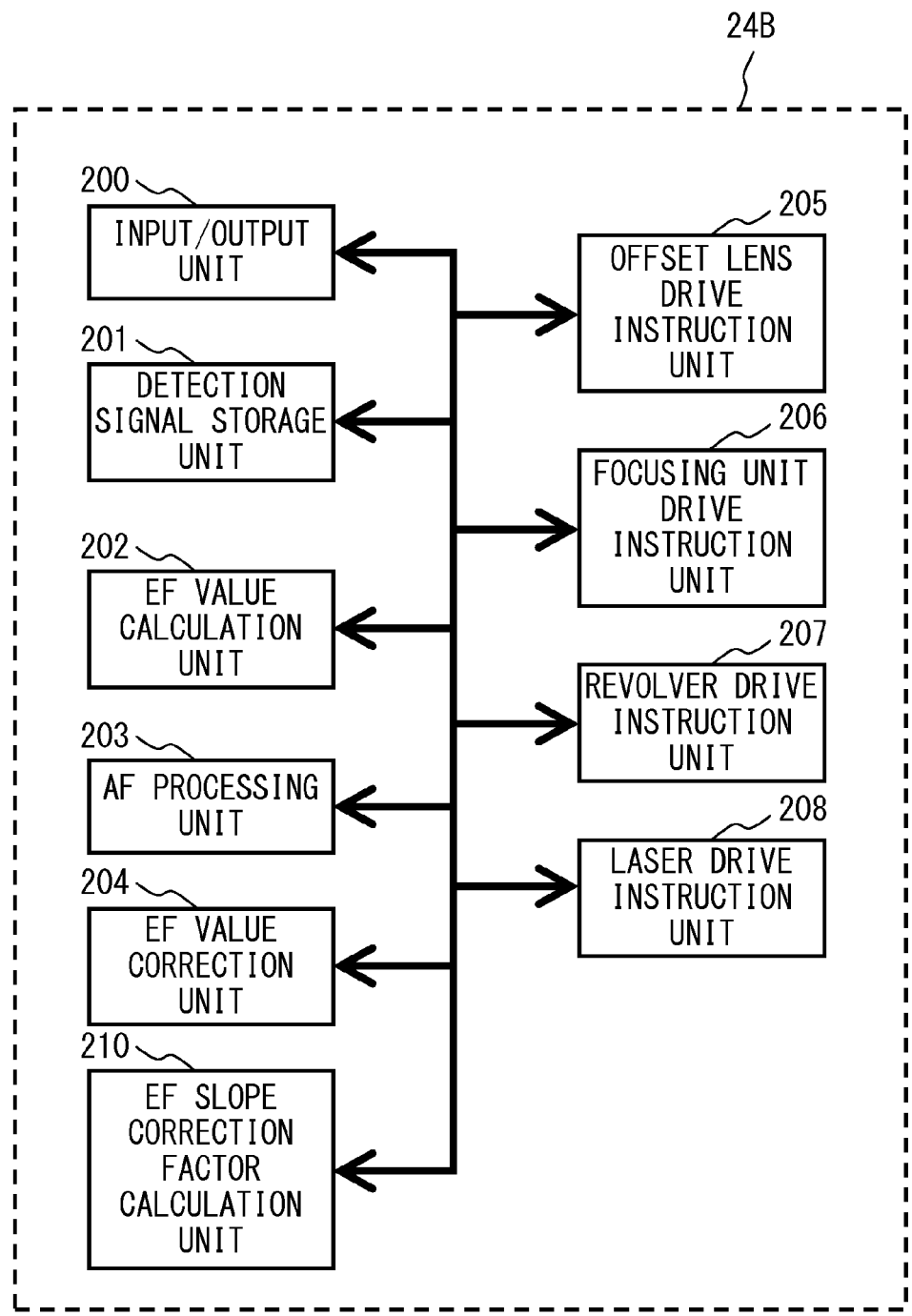
F I G. 9

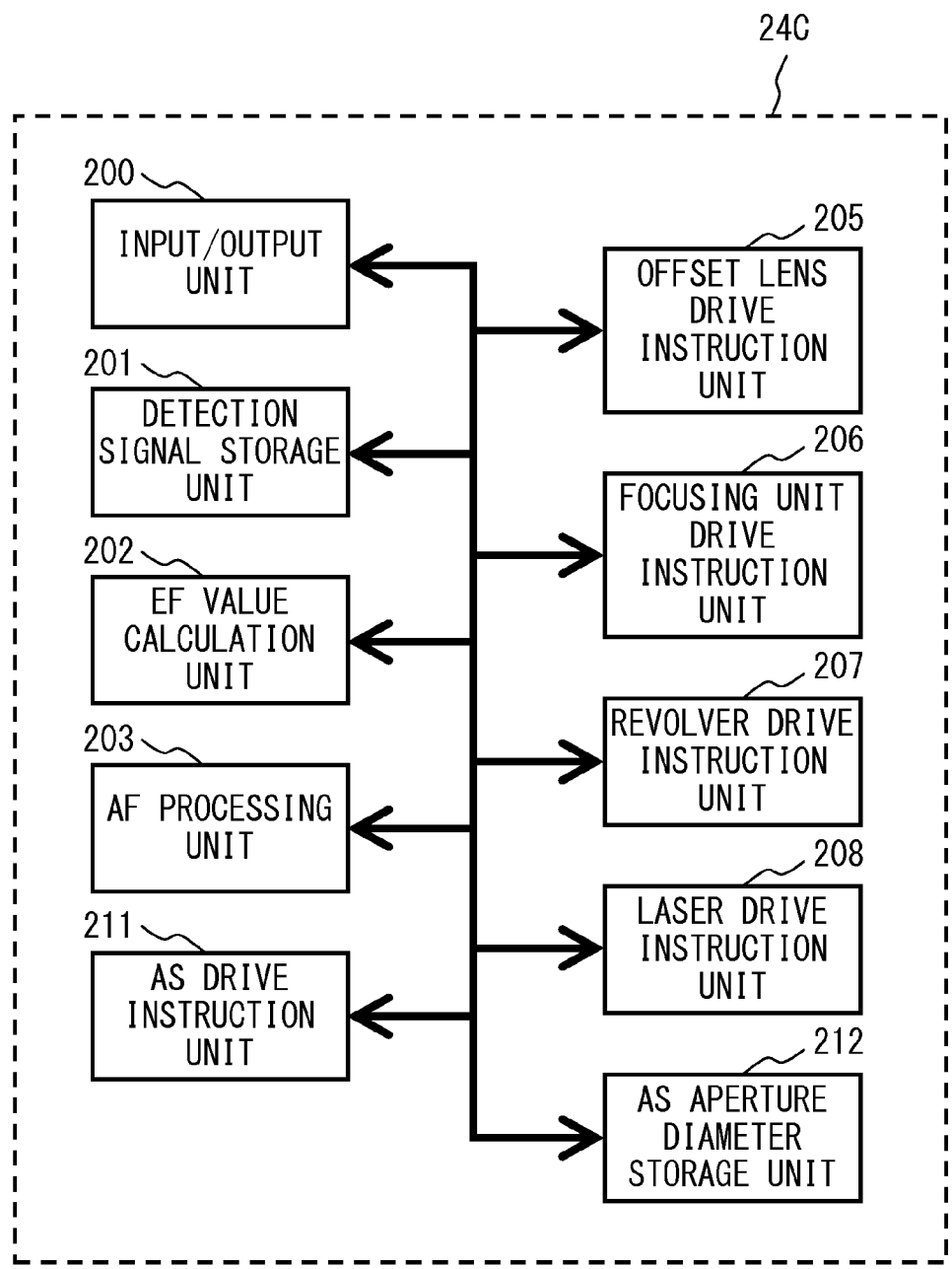
F I G. 1 2

| OFFSET LENS POSITION | -4~0mm | 0~5mm | 5~10mm | 10~15mm | 15~20mm | 20~22mm |
|---|---|---|---|---|---|---|
| APERTURE DIAMETER Φ | 3.4mm | 3.5mm | 3.6mm | 3.7mm | 3.8mm | 3.9mm |

FIG. 14

MICROSCOPE APPARATUS

CROSS REFERENCE TO RELATED APPLICATIONS

This application is based upon and claims the benefit of priority from the prior Japanese Patent Application No. 2011-134057, filed Jun. 16, 2011, the entire contents of which are incorporated herein by reference.

BACKGROUND OF THE INVENTION

1. Field of the Invention

The present invention relates to a microscope apparatus such as an optical microscope for optically observing an observation sample of a movable stage by using an objective lens, and relates in particular to a microscope apparatus having an autofocus (AF) function that allows automatic adjustment of a point of focus of the observation sample.

2. Description of the Related Art

Conventionally, microscopes that allow observation of fine samples and record the observed image as a video image have been in widespread use, from researches in the field of biology to inspection processes in the industry. Such microscopes have an AF function that allows automatic adjustment of a point of focus of an observation sample.

Normally, the AF is performed by using infrared light (AF light), and observation of a sample is performed by using visible light (observation light). For that reason, there may be variations in autofocus detection position due to the difference in wavelength of these two types of light and due to chromatic aberration for each of the objective lenses when plural objective lenses are used. As a means to compensate these variations, as described in Japanese Patent No. 4097761, for example, a technology of canceling out the chromatic aberration between the observation light and the AF light by arranging an offset lens for chromatic aberration in an in-focus detection optical system, setting an offset value from an in-focus point for each of the objective lenses, and adjusting the position of the offset lens for chromatic aberration has been developed.

The AF light is reflected at an interface between a cover glass with a relatively high reflectance and an observation sample or a surface of the cover glass, and the reflected light is detected. On the other hand, the observation light has to irradiate the observation sample itself, with a sample in liquid for example, and the reflected light needs to be detected. Therefore the lengths of optical paths of these two types of light are different. In order to correct these, a technology for matching the position of the observation sample to the focus of the objective lens by arranging a focusing offset lens on an optical path common to an optical system of the AF light and an optical system of illumination light or an optical path of either one of the optical systems, and for adjusting a position to form an image of the AF light by the focusing offset lens, as described in Japanese Patent Application Publication No. 2004-70276, for example, has been disclosed.

In such an AF function, a region of a photodiode that detects light is divided into two regions (A region and B region) at an optical axis of the reflected light as a center, and two sensors (sensors A and B) detect the light intensity of the respective regions as detection signals. A value obtained by dividing the difference between the signals (A−B) by the sum of the signals (A+B) is calculated ((A−B)/(A+B)) as an evaluation function value (EF value), and focus measurement is performed by using the EF value. In other words, the difference between the objective lens and the observation sample is changed relative to each other and a position at which the EF value becomes 0 is determined to be an in-focus position.

However, in the above-described detection signal of the light intensity, the beam diameters of the AF light at a pupil position of the objective lens are different depending on the position of the offset lens for chromatic aberration or of the focusing offset lens, and consequently, NA of light emitted from the objective lenses becomes different. As a result, variations are generated in the slope of the EF value in a state close to in focus. As the slope of the EF value becomes steeper, a range of an in-focus threshold at the time of focus measurement becomes narrower. In addition, when the slope of the EF value becomes steep because of the position of the offset lens for chromatic aberration or of the focusing offset lens, it becomes difficult for the tracking of in-focus positions to settle due to an influence of the ambient temperature or vibration.

SUMMARY OF THE INVENTION

A microscope apparatus of the present invention includes a plurality of objective lenses provided on an optical path in a switchable manner, an observation optical system for irradiating a sample mounted on a movable stage with visible light emitted from an illumination light source through one of the plurality of objective lenses, which is provided on the optical path, and for observing observation light reflected from the sample, and a focusing optical system for irradiating the sample with infrared light emitted from an autofocus light source through the one of the plurality of objective lenses, and the microscope apparatus comprises a photoreceiver unit to receive the reflected infrared light at each of two regions, an in-focus position adjusting unit to adjust an in-focus position of the sample based on a light intensity signal of the infrared light received by the photoreceiver unit, an evaluation function calculation unit to calculate an evaluation function by using the light intensity signal of the infrared light received by the photoreceiver unit, and an adjustment unit for adjusting a slope of the evaluation function calculated by the evaluation function calculation unit so as to be constant on the basis of a position of a correction lens group arranged on the optical path of the focusing optical system.

BRIEF DESCRIPTION OF THE DRAWINGS

The present invention will be more apparent from the following detailed description when the accompanying drawings are referenced.

FIG. 2A, FIG. 2B, and FIG. 2C are diagrams for explaining the state of an image formation on a bi-cell PD 14;

FIG. 3A and FIG. 3B are diagrams illustrating graphs of intensity and EF values of the detection signal of the bi-cell PD 14;

FIG. 4 is a diagram illustrating the EF values in a state close to in focus of each of the objective lenses with low NA, medium NA and high NA;

FIG. 5 is a diagram illustrating an internal configuration of a controller unit 24 in the first embodiment;

FIG. 7 is a diagram illustrating an example of correspondence between the EF values for each objective lens and the slope correction factor, which is stored in the EF slope correction factor storage unit 209;

FIG. 8 is a diagram illustrating the relationship between the focusing position and the EF value;

FIG. 9 is a diagram illustrating an internal configuration of the controller unit 24B in the second embodiment;

FIG. 12 is a diagram illustrating the internal configuration of the controller unit 24C of the third embodiment;

FIG. 14 is a diagram illustrating an example of correspondence of the aperture diameter data for each offset lens position stored in the AS aperture diameter storage unit 212.

DESCRIPTION OF THE PREFERRED EMBODIMENTS

Figure 1:
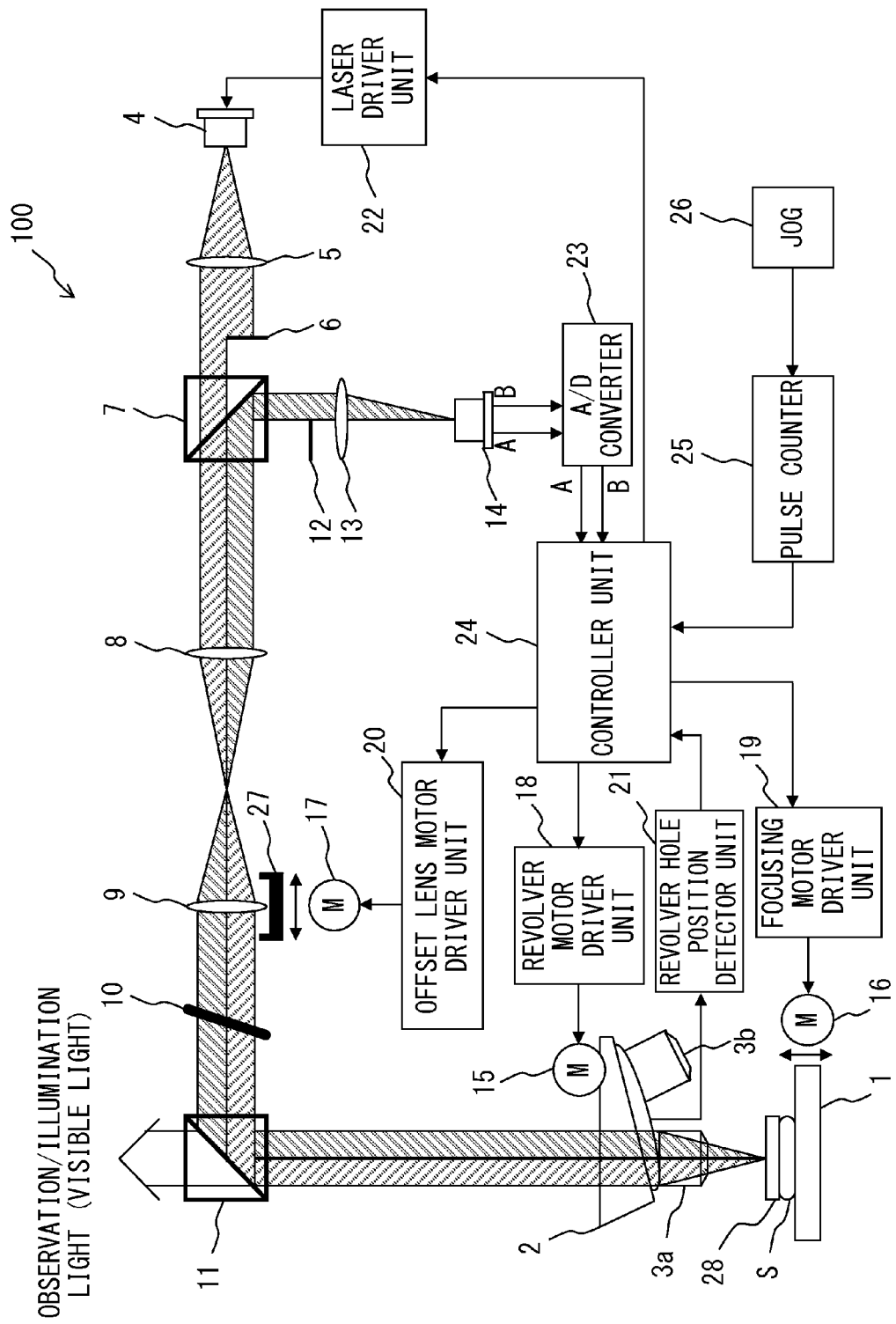
FIG. 1 is a diagram illustrating the entire configuration of a microscope apparatus that adopts the present invention.

In the following description, embodiments of the present invention are explained in detail with reference to the drawings.

More specifically, according to one mode of the present invention, the microscope apparatus of the present invention includes a plurality of objective lenses provided on an optical path in a switchable manner, an observation optical system for irradiating a sample mounted on a movable stage with visible light emitted from an illumination light source through one of the plurality of objective lenses, which is provided on the optical path, and for observing observation light reflected from the sample, and a focusing optical system for irradiating the sample with infrared light emitted from an autofocus light source through the one of the plurality of objective lenses, and the microscope apparatus comprises a photoreceiver unit to receive the reflected infrared light at each of two regions, an in-focus position adjusting unit to adjust an in-focus position of the sample based on a light intensity signal of the infrared light received by the photoreceiver unit, an evaluation function calculation unit to calculate an evaluation function by using the light intensity signal of the infrared light received by the photoreceiver unit, and an adjustment unit for adjusting a slope of the evaluation function calculated by the evaluation function calculation unit so as to be constant based on a position of a correction lens group arranged on the optical path of the focusing optical system.

In the microscope apparatus of the present invention, it is preferable that the adjustment unit performs adjustment based on a slope correction factor that is associated with a position of the correction lens group arranged on the optical path of the focusing optical system.

In addition, it is preferable that the microscope apparatus of the present invention further comprises a memory unit for storing the slope correction factor, and that the slope correction factor is determined in accordance with the position of the correction lens group and is stored in the memory unit.

It is also preferable that in the microscope apparatus of the present invention, the slope correction factor be determined in accordance with a magnification or a numerical aperture for each of the plurality of objective lenses.

Moreover, it is preferable that the microscope apparatus of the present invention further comprises a slope correction factor calculation unit to calculate the slope correction factor based on the evaluation function of at least two different positions of the correction lens group, and that the adjustment unit performs adjustment based on the slope correction factor calculated by the slope correction factor calculation unit.

Furthermore, it is preferable that the microscope apparatus of the present invention further comprises an aperture stop to change an aperture diameter of the infrared light emitted from the autofocus light source, and that the adjustment unit changes the aperture diameter of the aperture stop.

Additionally, it is preferable that in the microscope apparatus of the present invention, the evaluation function calculation unit calculates the evaluation function by dividing a difference between a first light intensity signal of the infrared light received in a first region of the photoreceiver unit and a second light intensity signal of the infrared light received in a second region of the photoreceiver unit by a sum of the first light intensity signal and the second light intensity signal.

(First Embodiment)

FIG. 1 is a diagram illustrating the entire configuration of a microscope apparatus that adopts the present invention.

In FIG. 1, a microscope apparatus 100 includes an electrical revolver consisting of a revolver body 2 on which plural objective lenses 3a and 3b can be mounted, a revolver motor 15 that performs electrical driving to insert an arbitrary objective lens 3a or 3b into an optical path by causing the revolver body 2 to revolve, and a revolver hole detector unit 21 for detecting which objective lens mounting position in the revolver body 2 is currently inserted into the optical path.

In this electrical revolver, the revolver motor 15 is driven to revolve by drive control of a revolver motor driver unit 18 that receives a signal from a controller unit 24, and information detected in the revolver hole position detector unit 21 that detects which hole position in the revolver body 2 the objective lens 3a or 3b is attached to is transmitted to the controller unit 24.

The controller unit 24 is a well-known CPU circuit, and consists of a CPU main body, a ROM storing a control program, a RAM that is a volatile memory for storing on an as-needed basis data required for control, I/O ports for inputting/outputting control signals, well-known peripheral circuits such as data buses connecting each of these units, an oscillator, and an address decoder, and controls peripheral devices through the data buses and the I/O ports.

A sample transfer table that carries an observation sample S to be observed can be electrically moved in an optical axis direction by a focusing motor 16. This focusing motor 16 is driven by a focusing motor driver unit 19 being controlled by the controller unit 24.

As a reference optical source 4 used for AF, an optical source of light in a wavelength range of invisible light such as infrared light is used. This reference light source 4 is controlled by a laser driver unit 22 that controls the intensity of the light source by pulse lighting of the light source. An infrared laser beam emitted as an AF beam passes though a collimator lens 5 for keeping parallel light and is guided to the observation sample S side through a floodlight side stopper 6 that cuts the light flux into half. In other words, the light flux collected by a condenser lens group 8 passes through an offset lens group 9, is polarized at 45 degrees when the light flux passes a λ/4 plate 10, and is reflected by a dichroic mirror 11.

The offset lens group 9 is configured to include both a zooming mechanism that changes a focal distance by means of an offset lens motor 17 and a mechanism to move toward the optical axis direction, and is driven by an offset lens motor driver unit 20. A limit detector unit 27 is provided on both ends of a prescribed range in the optical axis direction of the offset lens group 9 to limit the movement range of the offset lens group 9 in the optical axis direction.

The dichroic mirror 11 reflects only the infrared region but allows the visible region to pass through. As a result, the AF beam is reflected by the dichroic mirror 11, but the visible light to inspect the observation sample S, that is, observation light or illumination light, reaches an eyepiece, which is not illustrated in FIG. 1, through the objective lens 3a or 3b inserted into the optical path so that the observation sample S can be observed.

The AF light reflected by the dichroic mirror 11 forms a spotlight-like image on the observation sample S via the objective lens 3a or 3b. The AF beam reflected by the observation sample S passes through the objective lens 3a or 3b and the dichroic mirror 11 in reverse this time, and is polarized at 45 degrees when the AF beam once again passes through the λ/4 plate 10. Afterwards, the AF beam travels back to the offset lens group 9 and the condenser lens group 8 and enters a polarization beam splitter (PBS) 7. The polarized component in the AF beam reflected in the PBS 7 forms an image onto a bi-cell photodiode (PD) 14 after passing the photoreceiver-side stopper 12 and a condenser lens group 13.

The bi-cell PD 14 is a photodetector in which two photodiodes (sensors A and B) are aligned, centering around the optical axis. A current signal in accordance with the optical intensity of the spotlight-like image formed in the bi-cell PD 14 after undergoing current/voltage conversion is amplified at a prescribed amplification factor, and afterwards, is converted into a digital value by an A/D converter 23, and undergoes calculation processing in the controller unit 24.

The region of the photodiode can be divided into two regions (region A and region B) centering around the optical axis of the reflected light, and two sensors (sensors A and B) detect the light intensity in each of the regions as a detection signal. A value is calculated by dividing the difference between these (A−B) by the sum of these (A+B) ((A−B)/(A+B)) as an EF value, and focus measurement is performed by using the EF value. In other words, the relative distance between the objective lens 3a or 3b and the observation sample S is changed, and a point at which the EF value becomes zero is determined to be an in-focus position.

In addition, as an operation unit (not illustrated in FIG. 1) directly operated by an operator, an objective lens change SW for changing the objective lens 3a or 3b by revolving or sliding the revolver body 2, an AF switch for setting/releasing an AF operation, and a JOG encoder 26 for causing the up/down movement of the sample transfer stage 1 and the movement of the offset lens group 9 are provided. An encoder signal from the JOG encoder 26 is converted into a pulse count in a pulse counter 25 and is transmitted to the controller unit 24. The controller unit 24 determines how many times and in which direction the JOG encoder 26 is rotated by loading the pulse count from the pulse counter 25, and operates each of the driver units in accordance with the amount of rotation of the JOG encoder 26.

Next, the AF processing executed by the microscope apparatus 100 is explained.

When the AF switch for setting/releasing the AF operation is pressed down, the controller unit 24 provides a signal to a laser driver unit 22 to irradiate the observation sample S with an infrared spotlight for AF, and starts the vibration of the reference light source 4.

The observation sample S is irradiated with the spotlight of the light flux from the reference light source 4, and the reflected light is projected on the bi-cell PD 14. On the basis of the position of this projected spotlight, the AF control is performed.

FIG. 2A, FIG. 2B, and FIG. 2C are diagrams for explaining the state of an image formation on the bi-cell PD 14, FIG. 2A is a diagram of a case in which the objective lens 3a with a medium NA is used, FIG. 2B is a diagram of a case in which the objective lens 3b with a high NA is used, and FIG. 2C is a diagram of a case in which an objective lens with a low NA is used.

First, a case in which the position of a cover glass 28 is above an in-focus position, or in other words, a case in which the cover glass 28 is placed at a position closer to the objective lens 3a is considered. In such a case, because the AF light is quickly reflected from the cover glass 28, as illustrated in FIG. 2A, a spotlight image 201a formed on the bi-cell PD 14 is formed closer to a sensor A with respect to the center position. On the other hand, when the cover glass 28 is positioned below the in-focus position, or in other words, when the cover glass 28 is at a position far from the objective lens 3a, a spotlight image 202a formed on the bi-cell PD 14 is formed closer to a sensor B.

In addition, when the cover glass 28 is exactly at the in-focus position, a spotlight image 203a is formed roughly at the center of an optical axis that is within a range equal from the sensors A and B. Furthermore, in such a case, the light intensity at the center becomes the highest since the cover glass 28 is at the focal position.

In the case of an objective lens with a high NA that has a smaller focal depth, as illustrated in FIG. 2B, the shapes of the spotlights 201b and 202b positioned above and below the in-focus position are larger than the spotlight images 201a and 202a of the objective lens with a medium NA. In the case of a low-power objective lens having a large focal depth, as illustrated in FIG. 2C, the shapes of the spotlights 201c and 202c positioned above and below the in-focus position are smaller than the spotlight images 201a and 202a of the objective lens with a medium NA.

In this manner, the spotlights formed on the photodiode of the bi-cell PD 14 are different in accordance with the objective lens with a medium NA, the objective lens with a high NA, and the objective lens with a low NA.

As described above, the bi-cell PD 14 has a photodiode region divided into two regions (the A region and B region) at the optical axis of the reflected light as a center, and the light intensity in each region is detected as a detection signal by each of two sensors (sensors A and B). The controller unit 24 calculates an EF value and performs focus measurement.

More specifically, the AF operation is performed by relatively changing the distance between the objective lens 3a or 3b and the observation sample S and moving the sample transfer stage 1 so that the EF value becomes 0. In other words, when the output of the sensor B is large, the sample transfer stage 1 is driven upward, and when the output of the sensor A is large, the sample transfer stage 1 is driven downward. As a result, the observation sample S can be accurately in focus.

Since this amount of correction movement varies depending on the characteristics of the objective lens 3a or 3b and the wavelength used in the reference light source 4, the value of correction movement for each of the objective lenses 3a and 3b is stored in advance in a ROM or other non-volatile memory storage medium such as EEPROM.

Even if the controller unit 24 makes a focus measurement in the above manner, since the reference light source 4, which performs AF operation, outputs infrared light that has a different wavelength than the wavelengths of visible light, there might be a situation in which the sample is out of focus in the visible light region due to chromatic aberration. The offset lens group 9 corrects this out-of-focus state.

The controller unit 24 provides the offset lens motor driver unit 20 with a drive instruction to drive the offset lens motor 17, adjusts a travel amount of the offset lens group 9 in the optical axis direction, and corrects the image formation position of the bi-cell PD 14.

FIG. 3A and FIG. 3B are diagrams illustrating graphs of intensity and EF values of the detection signal of the bi-cell PD 14, FIG. 3A illustrates A and B signals when objective lenses with a low NA, medium NA, and high NA are used for detection, and FIG. 3b illustrates EF values ((A−B)/(A+B)) calculated from these A and B signals.

The controller unit 24 determines an in-focus position in the following manner by using the sum of A and B signals (A+B), and the EF values ((A−B)/(A+B)).

First, the noise thresholds (NTH) set in each of the objective lenses 3a and 3b is read out from the non-volatile memory, which is not illustrated, and is compared with the value of (A+B). As a result, when the value of (A+B) is smaller than a predetermined noise threshold NIT-1, or in other words, in the case of (A+B)<NTH, when the controller unit 24 judges that the cover glass 28 has not been put in place, and drives the sample transfer stage 1 so that the value of (A+B) becomes the noise threshold NTH or larger, or in other words (A+B)≥NIT is true.

A range in which the cover glass 28 should be added is, as illustrated in FIG. 3A, a range 301 in the case of the objective lens with a low NA, a range 302 in the case of the objective lens with a medium NA, and a range 303 in the case of the objective lens with a high NA. The range is the narrowest in the case of the high-NA objective lens 3b and the range becomes broader as the magnification of the objective lens becomes lower.

When (A+B)≥NIT is satisfied, the controller unit 24 drives the sample transfer stage 1 so that the EF value enters within a prescribed in-focus range. In other words, the controller unit 24 moves the sample transfer stage 1 so that the following inequality (1) is true, and stops the operation of the sample transfer stage 1 when the inequality is satisfied.

$$-FTH < (A-B)/(A+B) < +FTH \quad (1)$$

Here, FTH is a focus measurement threshold that is a value determined so that the position of the sample transfer stage 1 is always moved within the range of focal depth of the objective lens 3a or 3b and a value set in each of the objective lenses 3a and 3b.

A position at which the above inequality (1) is satisfied is the in-focus position, and the focus measurement threshold FIT-I is determined to be equal to or less than a value of the focal depth of the objective lens 3a or 3b.

As illustrated in FIG. 3B, the slopes of the EF values near the in-focus level are different in each of the object lenses with a low NA, medium NA, and high NA due to the position of a chromatic aberration correction offset lens or a focus adjustment offset lens, or due to the magnification of the objective lens.

FIG. 4 is a diagram illustrating the EF values near the in-focus level of each of the objective lenses with a low NA, medium NA and high NA.

As illustrated in FIG. 4, the steeper the slope of the EF value is, the narrower the range of the focus measurement threshold FIT-I becomes at the time of the focus measurement. As a result, it is difficult for the tracking of in-focus positions to settle due to the influence of the ambient temperature or vibration.

In consideration of this, the microscope apparatus 100 that adopts the present invention sets a slope correction factor corresponding to the position of the offset lens group 9 for each of the objective lenses 3a and 3b so that the slopes of the EF values in the state close to in focus are always kept constant.

FIG. 5 is a diagram illustrating an internal configuration of the controller unit 24 in the first embodiment.

In FIG. 5, the controller unit 24 includes an input/output unit 200, a detection signal storage unit 201, an EF value calculation unit 202, an AF processing unit 203, an EF value correction unit 204, an offset lens drive instruction unit 205, a focusing unit drive instruction unit 206, a revolver drive instruction unit 207, a laser drive instruction unit 208, and an EF-slope correction factor storage unit 209.

The input/output unit 200 is for inputting a detection value of the bi-cell PD 14, which is converted into a digital value in the A/D converter 23, an encoder signal from the JOG encoder 26 converted into a pulse count in the pulse counter 25, or an objective lens mounting position in the revolver body 2 currently inserted into the optical path, and outputting drive signals for driving the revolver motor driver unit 18, the focusing motor driver unit 19, the offset lens motor driver unit 20, and the laser driver unit 22 to each of those driver units.

The detection signal storage unit 201 stores a detection value of the bi-cell PD 14, which is converted into a digital value in the A/D converter 23, and the EF value calculation unit 202 calculates an EF value based on the detection value of the bi-cell PD 14 stored in the detection signal storage unit 20.

The AF processing unit 203 executes the above described AF processing by using the EF value calculated in the EF value calculation unit 202.

The EF value correction unit 204 maintains the slope of the EF value constant based on the slope correction factor corresponding to the position of the offset lens group 9 for each of the objective lenses 3a and 3b.

The offset lens drive instruction unit 205 issues an instruction to drive the offset lens group 9, the focusing unit drive instruction unit 206 issues an instruction to drive the focusing motor driver unit 19, the revolver drive instruction unit 207 issues an instruction to drive the electrical revolver, and the laser drive instruction unit 208 issues an instruction to drive the laser driver unit 22.

The EF slope correction factor storage unit 209 stores a slope correction factor corresponding to the position of the offset lens group 9 for each of the objective lenses 3a and 3b.

Figure 6:
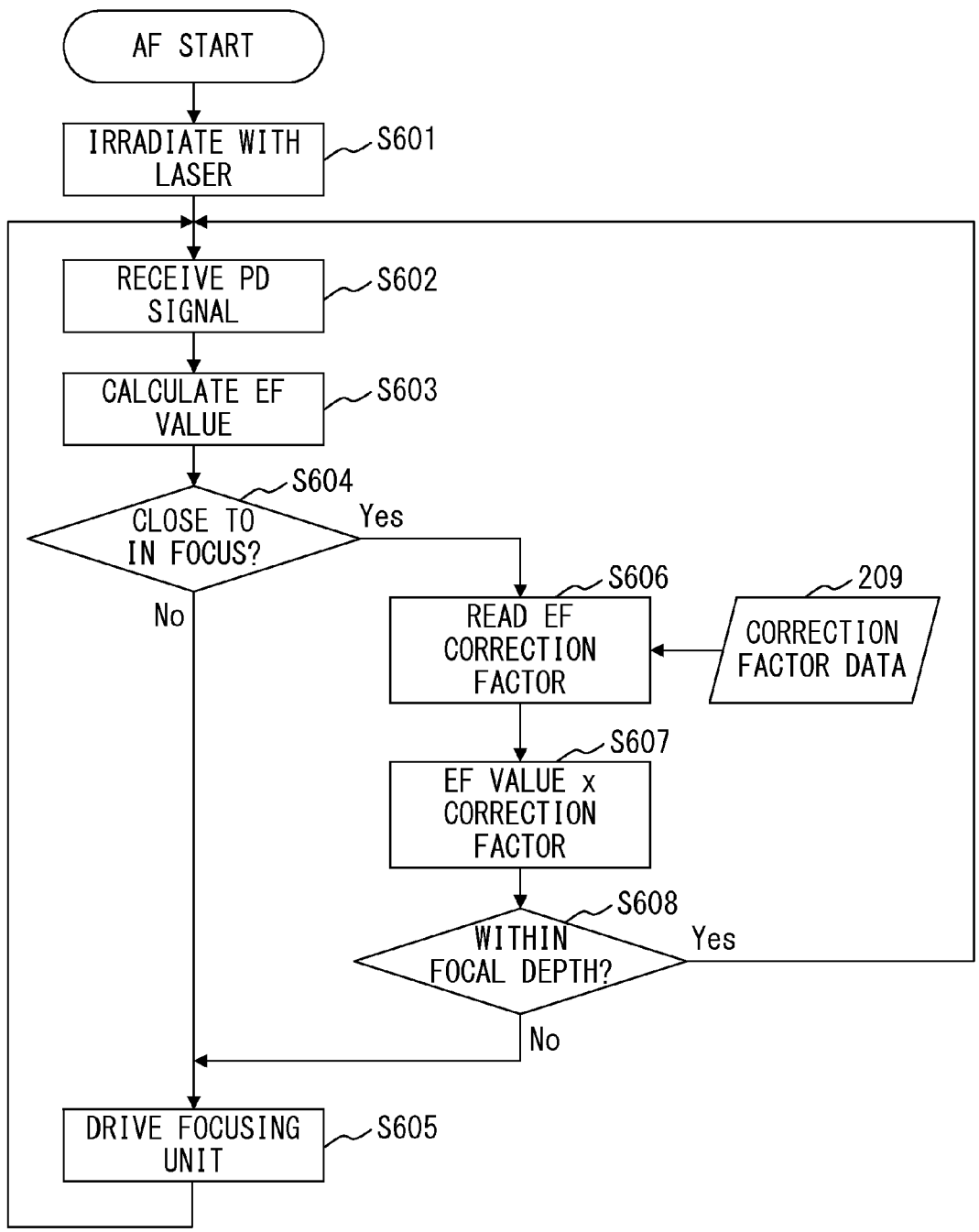
FIG. 6 is a flowchart illustrating the flow of the AF processing in the first embodiment.

FIG. 6 is a flowchart illustrating the flow of the AF processing in the first embodiment.

First, in step S601, the controller unit 24 provides a signal to the laser driver unit 22 to irradiate the observation sample S with an infrared spotlight for AF, and when the vibration of the reference light source 4 is started, in step S602, the bi-cell PD 14 detects a light intensity in each of two regions (A region, B region) of the photodiode divided at the optical axis of the reflected light as detection signals.

In step S603, an EF value is calculated on the basis of the detection value of the bi-cell PD 14.

Next, in step S604, whether or not a state close to in focus is obtained is judged, and when the focusing is not close to in focus (step S604: No), in step S605, by driving the focusing motor 16, the sample transfer stage 1 is moved upward/downward on the optical axis for the purpose of focusing.

Meanwhile, when it is judged in step S604 to be a state close to in focus (step S604: Yes), the slope correction factor stored in the EF slope correction factor storage unit 209 is read out in step S606. It should be noted that this step S606 can be skipped in the case in which, for example, the same objective lens is used, because once this step is executed, the data read out at the first time can be used in the second and subsequent times.

FIG. 7 is a diagram illustrating an example of a correspondence between the EF values for each objective lens and the slope correction factor, which is stored in the EF slope correction factor storage unit 209.

In the example illustrated in FIG. 7, when the position of the offset lens group 9 in the optical axis direction is classified as "−4 mm or more and less than 0 mm", which is set to be a reference, "0 mm or more and less than 5 mm", "5 mm or more and less than 10 mm", "10 mm or more and less than 15 mm", "15 mm or more and less than 20 mm", and "20 mm or more and less than 22 mm", in each of the cases, the slope correction factor becomes "1.0" at the reference, "1.1", "1.2", "1.3", "1.4", and "1.5", respectively.

These slope correction factors are determined in the following manner.

FIG. 8 is a diagram illustrating the relationship between the focusing position and the EF value.

A solid line and a dotted line in FIG. 8 represent approximation expressions obtained from the measured values. The solid line in FIG. 8 represents the relationship between the focusing position and the EF value in the case in which the position of the offset lens group 90 under the condition of using 60-power objective lens is at −4 mm in the optical axis direction, and the dotted line represents the relationship in the case in which the position of the offset lens group 9 is 22 mm.

As illustrated in FIG. 8, under the condition of using the 60-power objective lens, when the slopes of the EF values are compared between a case in which the position of the offset lens 9 is at −4 mm and a case in which the position of the offset lens 9 is at 22 mm, the slope at the position of −4 mm, which is farther away from the objective lens, is steeper. The slope at −4 mm is 1.5 times steeper than the slope at 22 mm.

At this time, the range of a threshold when the EF value is from −1000 to 1000 is 174 nm at the position of −4 mm, and 261 nm at the position of 22 mm, and the difference is approximately 100 nanometers. In other words, the position of −4 mm is more likely to be affected by vibration. Here, this difference can be eliminated by multiplying the EF value at the position of −4 mm by the inverse of 1.5.

Considering this, in step S607 in FIG. 6, a value obtained by multiplying the EF value by a slope correction factor is calculated. As a result, the slope of the EF values near an in-focus level becomes constant regardless of the position of the offset lens group 9.

In step S608, whether or not being within the focal depth is achieved is determined by using the value calculated in step S607 and the noise threshold NIT set in each of the objective lenses 3*a* and 3*b*, and when it is within the focal depth (step S608: Yes), the process returns to step S602. On the other hand, when it is not within the focal depth due to changes in environmental temperature and vibration (step S608: No), the process proceeds to step S605.

According to the above process, by correcting the EF value with the slope correction factors that correspond to the position of the offset lens group 9 for each of the objective lenses 3*a* and 3*b*, the slope of the EF value in a state close to in focus becomes constant regardless of the position of the offset lens group 9, and the influence caused by disturbances such as vibrations can be reduced.

(Second Embodiment)

Next, the second embodiment of the present invention is explained.

The second embodiment of the present invention is characterized by obtaining the slope correction factors during the AF processing, whereas the above-described first embodiment stores in advance the slope correction factors for correcting EF values.

The entire configuration of the microscope apparatus is the same as the first embodiment illustrated in FIG. 1, except for including a controller unit 24B instead of the controller unit 24. For that reason, the explanation of the configuration is omitted.

FIG. 9 is a diagram illustrating an internal configuration of the controller unit 24B in the second embodiment.

In FIG. 9, the controller unit 24B includes an input/output unit 200, a detection signal storage unit 201, an EF value calculation unit 202, an AF processing unit 203, an EF value correction unit 204, an offset lens drive instruction unit 205, a focusing unit drive instruction unit 206, a revolver drive instruction unit 207, a laser drive instruction unit 208, and an EF slope correction factor calculation unit 210.

The EF slope correction factor calculation unit 210 samples the EF values at predetermined intervals, and calculates the slope correction factor of the EF value so that the slope is constant. For example, as described above, in the case of using the 60-power objective lens, the EF values in the case in which the position of the offset lens group 9 is at −4 mm and in the case in which the position is at 22 mm are calculated, and the slopes of the EF values are obtained.

It should be noted that explanations of the configuration of the controller unit 24B, which is the same as the configuration of the controller unit 24, are omitted.

Figure 10:
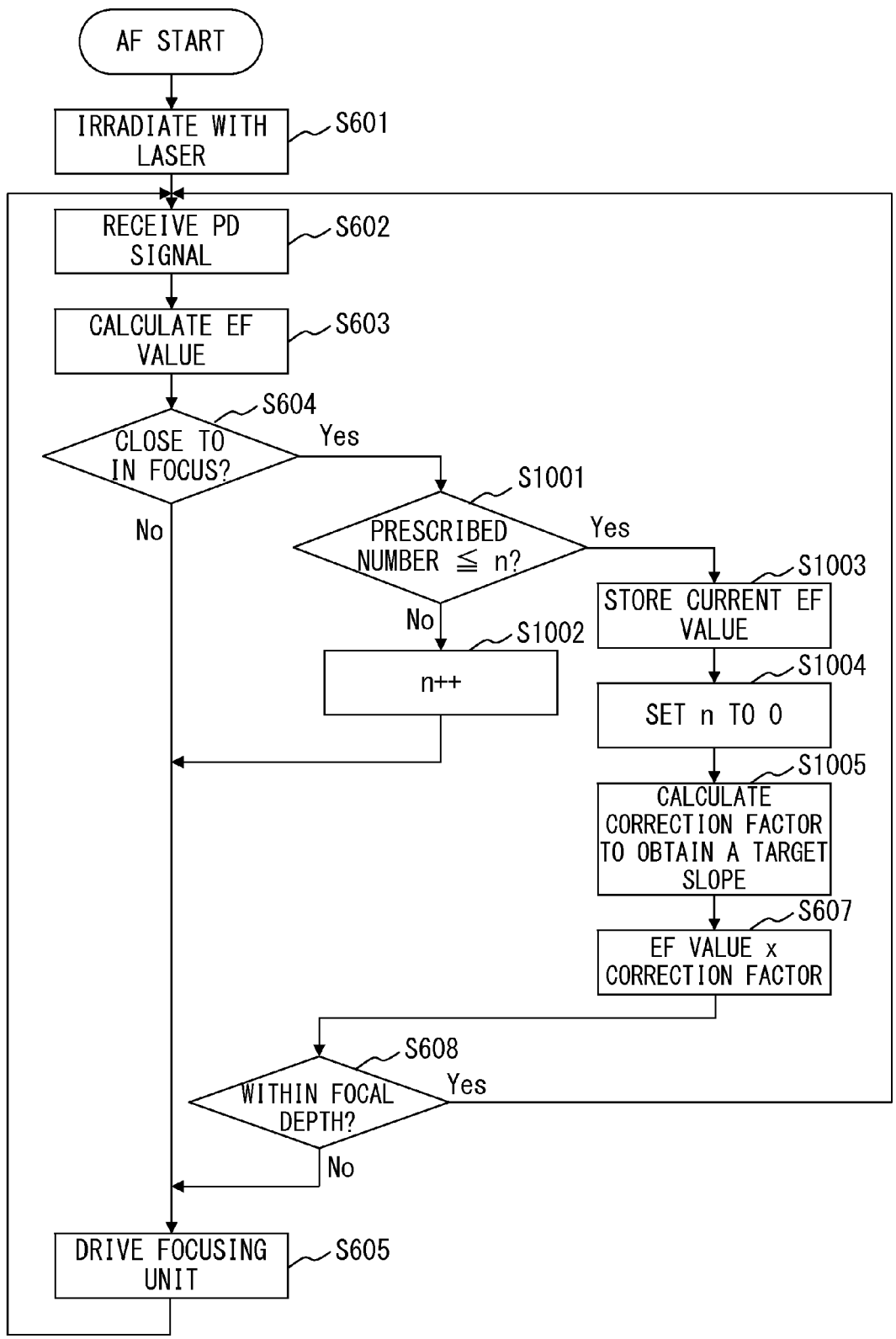
FIG. 10 is a flowchart illustrating a flow of the AF processing in the second embodiment.

FIG. 10 is a flowchart illustrating a flow of the AF processing in the second embodiment.

In the flowchart in FIG. 10, steps S1001 to S1005 are executed instead of step S606 in the flowchart of FIG. 6.

In other words, when obtainment of the state close to in focus is judged in step S604 in FIG. 10 (step S604: Yes), the EF value in step S603 is calculated until the number of times n of the sampling reaches a prescribed number in steps S1001 and S1002.

When the number of times n reaches the prescribed number in step S1001 (step S1001: Yes), the current EF value is temporarily stored in a memory in step S1003, and afterwards n is set to 0 in step S1004.

In step S1005, the slope correction factor of the EF value to correct the slope to a target slope is calculated, and the process proceeds to step S1004.

As a result, a memory for storing a table in FIG. 7 for example, which is necessary in the first embodiment, is no longer necessary, and the slope of the EF values in the state close to in focus becomes constant so that the influence caused by a disturbance such as a vibration can be reduced.

It should be noted that in the case in which the controller unit 24B has the same EF slope correction factor storage unit 209 as that of the first embodiment, and after calculating the slope correction factor in step S1005, the calculated slope correction factor is stored in the EF slope correction factor storage unit 209, and the calculation in step S1005 does not have to be executed every time as the stored slope correction factor may be used after the calculation.

(Third Embodiment)

Next, the third embodiment of the present invention is explained.

Figure 11:
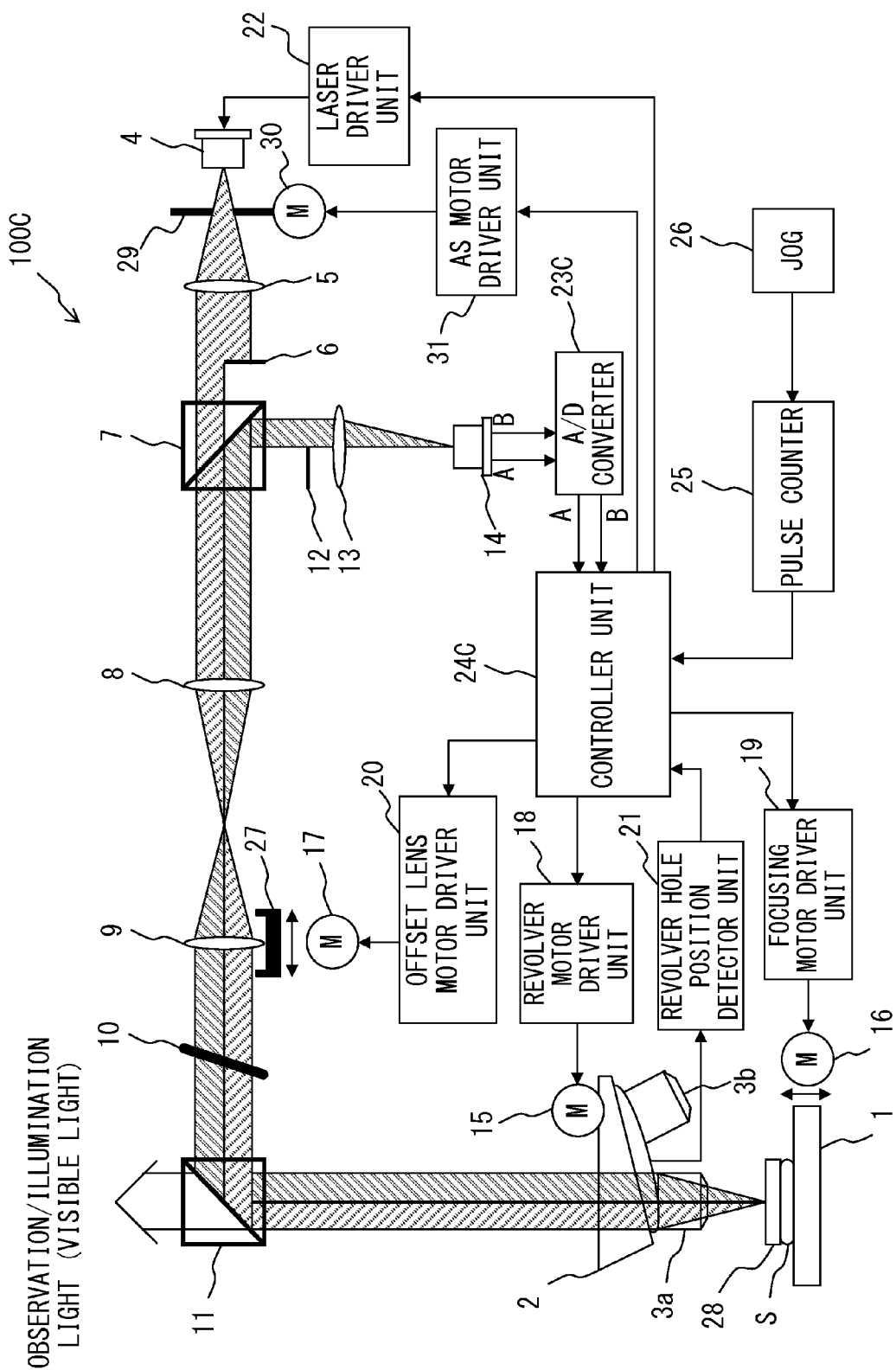
FIG. 11 is a diagram illustrating the entire configuration of the microscope apparatus of the third embodiment.

FIG. 11 is a diagram illustrating the entire configuration of the microscope apparatus of the third embodiment.

The microscope apparatus 100C of the third embodiment of the present invention is characterized as including an aperture stop (AS) 29, an AS motor 30, and an AS motor driver unit 31, in addition to the configuration of the microscope apparatus 100 of the first embodiment described above. The explanation of the portions of the configuration that are identical with the microscope apparatus 100 illustrated in FIG. 1 is omitted.

The aperture stop 29 is provided between the reference light source 4 and the collimator lens 5 to adjust a beam diameter of the AF light at a position of a pupil of the objective lens 3a or 3b. Under control of the controller unit 24C, the AS motor 30 is driven by the AS motor driver unit 31 and changes the aperture diameter of the aperture stop 29.

Because the AF light emitted from the reference light source 4 is narrowed down by the aperture stop 29, the potential of the detection signal of the bi-cell PD 14 changes in accordance with the aperture diameter of the aperture stop 29. Accordingly, the potential needs to be adjusted. For example, an adjustment is made by amplifying a current signal in accordance with the light intensity of the spotlight-like image formed in the bi-cell PD 14 by means of the A/D converter 23C with a prescribed amplification factor. Alternatively, the adjustment is made in the controller unit 24 by controlling the laser driver unit 22 to control the intensity of the light source.

FIG. 12 is a diagram illustrating the internal configuration of the controller unit 24C of the third embodiment.

In FIG. 12, the controller unit 24C includes an input/output unit 200, a detection signal storage unit 201, an EF value calculation unit 202, an AF processing unit 203, an offset lens drive instruction unit 205, a focusing unit drive instruction unit 206, a revolver drive instruction unit 207, a laser drive instruction unit 208, an AS drive instruction unit 211, and an AS aperture diameter storage unit 212.

The AS aperture diameter storage unit 212 stores a predetermined aperture diameter of the aperture stop 29 in accordance with type information of the objective lens 3a or 3b moved into the optical path by the revolver drive instruction unit 207 and position information of the offset lens group 9 moved by the offset lens drive instruction unit 205.

The AS drive instruction unit 211 changes the aperture stop 29 so that the aperture diameter becomes the diameter stored in the AS aperture diameter storage unit 212. It should be noted that even if the position of the offset lens group 9 is moved during the AF tracking operation, the AS drive instruction unit 211 may change the aperture stop 29 to track the movement.

It should be noted that in the controller unit 24C, the explanation of the configurations that are identical with those of the controller unit 24 is omitted.

Figure 13:
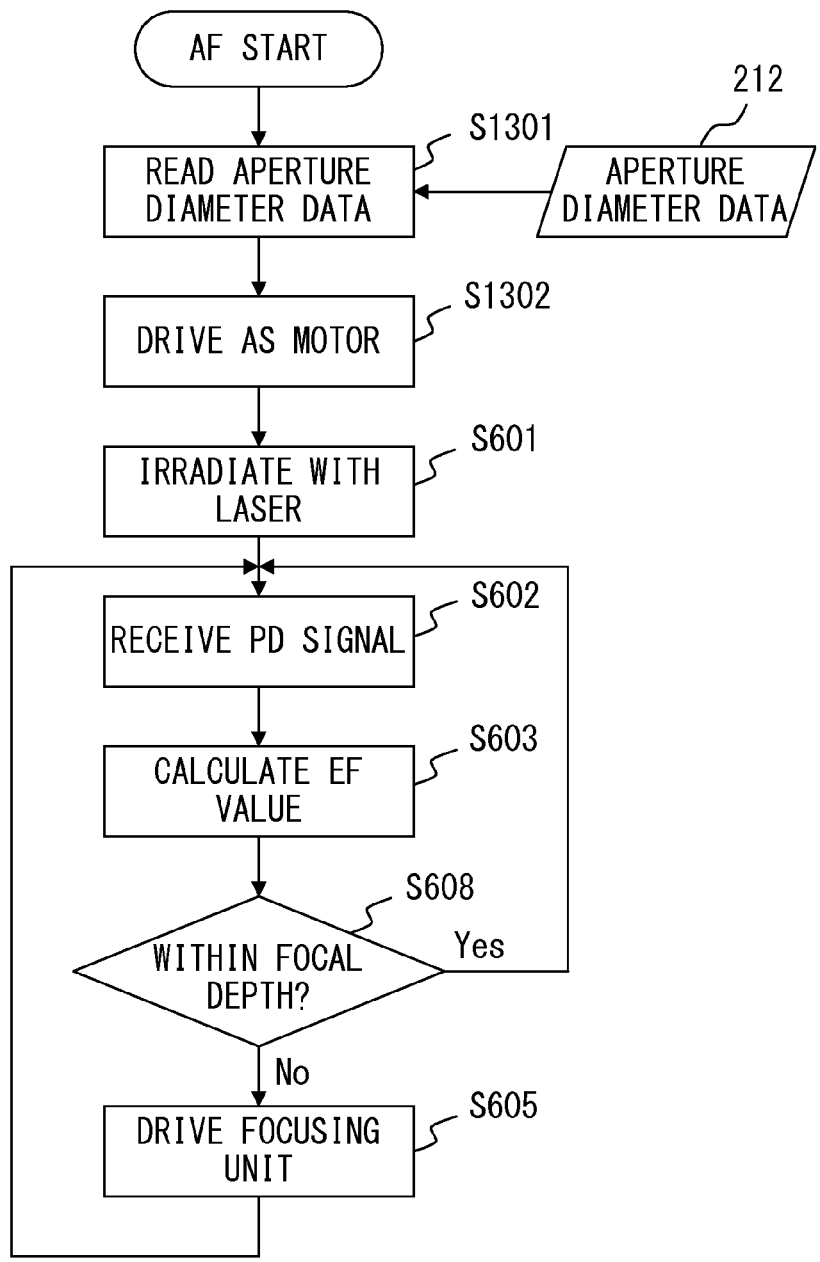
FIG. 13 is a flowchart of a flow of the AF processing of the third embodiment.

FIG. 13 is a flowchart of a flow of the AF processing of the third embodiment.

First, in step S1301, the aperture diameter data stored in the AS aperture diameter storage unit 212 is read out.

FIG. 14 is a diagram illustrating an example of correspondence of the aperture diameter data for each offset lens position stored in the AS aperture diameter storage unit 212.

In the example illustrated in FIG. 14, when the position of the offset lens group 9 in the optical axis direction is classified as "−4 mm or more and less than 0 mm", which is set to be a reference, "0 mm or more and less than 5 mm", "5 mm or more and less than 10 mm", "10 mm or more and less than 15 mm", "15 mm or more and less than 20 mm", and "20 mm or more and less than 22 mm", in each of the cases, the aperture diameter becomes "3.4 mm", "3.5 mm", "3.6 mm", "3. 7 mm", "3.8 mm" and "3.9 mm", respectively.

Afterwards, in step S1302, the AS motor 30 is driven to move the aperture stop 29 so that the aperture diameter of the aperture stop 29 becomes a diameter that corresponds to the type information of the objective lens 3a or 3b and the position information of the offset lens group 9.

Next, in step S601, the controller unit 24C provides a signal to the laser driver unit 22 to irradiate the observation sample S with an infrared spotlight of AF and starts the vibration of the reference light source 4. In step S602, the bi-cell PD 14 detects as a detection signal the light intensity in each of the two regions (A region and B region) of a photodiode divided at the optical axis of the reflected light as a center.

In step S603, an EF value is calculated on the basis of the detection value of the bi-cell PD 14.

Instep S608, whether or not being within the focal depth is achieved is determined by using the value calculated instep S607 and the noise threshold NTH set in each of the objective lenses 3a and 3b, and when it is within the focal depth (step S608: Yes), the process returns to step S602.

On the other hand, when it is not within the focal depth due to changes in environmental temperature and vibration (step S608: No), the process proceeds to step S605, and the sample transfer stage 1 is moved upward/downward in the optical axis direction for the purpose of focusing by driving the focusing motor 16.

As described above, the aperture diameter of the aperture stop 29 can be changed for each of the positions of the offset lens group 9 so that a beam diameter of the AF light at a position of a pupil of the objective lens 3a or 3b can be changed. As a result, since the EF value is kept constant in a state close to in focus, the influence of a disturbance such as a vibration can be reduced.

Although each of the embodiments to which the present invention is applied has been described above, the present invention is not to be limited but is to be construed as embodying various constructions and modifications without departing from the gist of the present invention.

According to the present invention, regardless of the position of an achromatic offset lens or a focus adjusting offset lens, the slope of the EF value is kept constant in a state close to in focus and the range of an in-focus threshold at the time of the focus measurement becomes stable . As a result, such an advantage that stable continuous focusing can be achieved is obtained.

What is claimed is:

1. A microscope apparatus including a plurality of objective lenses provided on an optical path in a switchable manner, an observation optical system for irradiating a sample mounted on a movable stage with visible light emitted from an illumination light source through one of the plurality of objective lenses, which is provided on the optical path, and for observing observation light reflected from the sample, and a focusing optical system for irradiating the sample with infrared light emitted from an autofocus light source through the one of the plurality of objective lenses, comprising:

a photoreceiver unit to receive the reflected infrared light;
   an in-focus position adjusting unit to adjust an in-focus position of the sample based on a light intensity signal of the infrared light received by the photoreceiver unit;
   an evaluation function calculation unit to calculate an evaluation function by using the light intensity signal of the infrared light received by the photoreceiver unit;
   an aperture stop to change an aperture diameter of the infrared light emitted from the autofocus light source; and
   an adjustment unit to adjust the aperture diameter of the aperture stop based on a position of a correction lens group arranged on the optical path of the focusing optical system.

2. The microscope apparatus according to claim 1,
   wherein the photoreceiver unit includes a first region and a second region, and wherein the evaluation function calculation unit calculates the evaluation function based on a difference between a first light intensity signal of the infrared light received in the first region of the photoreceiver unit and a second light intensity signal of the infrared light received in the second region of the photoreceiver unit, and a sum of the first light intensity signal and the second light intensity signal.

3. The microscope apparatus according to claim 2, wherein the adjustment unit adjusts the aperture diameter of the aperture stop so that a slope of the evaluation function calculated by the evaluation function calculation unit becomes constant.

\* \* \* \* \*